US012612152B2

(12) United States Patent
Schlipf et al.

(10) Patent No.: US 12,612,152 B2
(45) Date of Patent: Apr. 28, 2026

(54) WING FOR AN AIRCRAFT

(71) Applicant: Airbus Operations GmbH, Hamburg (DE)

(72) Inventors: Bernhard Schlipf, Hamburg (DE); Alexander Burchard, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 19/071,178

(22) Filed: Mar. 5, 2025

(65) Prior Publication Data

US 2025/0282471 A1 Sep. 11, 2025

(30) Foreign Application Priority Data

Mar. 8, 2024 (EP) ..................................... 24162370

(51) Int. Cl.
B64C 9/24 (2006.01)
B64C 9/02 (2006.01)

(52) U.S. Cl.
CPC . B64C 9/24 (2013.01); B64C 9/02 (2013.01)

(58) Field of Classification Search
CPC ................ B64C 9/24; B64C 9/02; B64C 9/22
See application file for complete search history.

(56) References Cited

U.S. PATENT DOCUMENTS 2,749,060 A 6/1956 Brady et al.
3,941,334 A 3/1976 Cole 4,040,579 A 8/1977 McKinney et al.
4,171,787 A 10/1979 Zapel
4,252,287 A * 2/1981 Zimmer .................... B64C 3/48
                                                    244/214
4,427,168 A 1/1984 Grip et al.
2016/0009372 A1 1/2016 McKinney et al.
2022/0306277 A1* 9/2022 Gartelmann .............. B64C 3/28

OTHER PUBLICATIONS

European Search Report for corresponding European Patent Application No. 24162370.1 dated Aug. 30, 2024.

* cited by examiner

*Primary Examiner* — Rodney A Bonnette
(74) *Attorney, Agent, or Firm* — Greer, Burns & Crain, Ltd.

(57) ABSTRACT

An aircraft wing, including a main wing with upper and lower skin panels, a leading-edge high lift assembly including a high lift body, and a connection assembly connecting the high lift body to the main wing, the high lift body being movable relative to the main wing between stowed and deployed positions. The connection assembly includes a rotation element mounted to both the high lift body and the main wing rotatably about a rotational axis. The upper skin panel has a leading-edge portion. The high lift body includes a rigid portion and a flexible skin portion with the rigid portion mounted to the rotation element. The flexible skin portion connects to the upper skin panel leading-edge portion and to the high lift body rigid portion, while being configured to be deformed between stowed and deployed deformation states, when the high lift body moves between the stowed and deployed positions.

15 Claims, 10 Drawing Sheets

WING FOR AN AIRCRAFT

CROSS-REFERENCES TO RELATED APPLICATIONS

This application claims the benefit of European Patent Application Number 24162370.1 filed on Mar. 8, 2024, the entire disclosure of which is incorporated herein by way of reference.

FIELD OF THE INVENTION

The present invention relates to a wing for an aircraft. Further aspects of the invention relate to a leading-edge high lift assembly for such a wing as well as an aircraft comprising such a leading-edge high lift assembly and/or such a wing.

BACKGROUND OF THE INVENTION

The wing comprises a main wing and a leading-edge high lift assembly movable relative to the main wing to increase lift of the wing. The leading-edge high lift assembly comprises a high lift body and a connection assembly. The high lift body is preferably a droop high lift body referred to as droop nose, droop leading-edge, droop flap or slat, in particular sealed slat. The connection assembly is configured for connecting the high lift body to the main wing, in particular to the leading-edge of the main wing, in such a way that the high lift body is movable relative to the main wing between a stowed position and a deployed position. The stowed position relates to a position where the wing profile has a lower curvature and might also be referred to as straight position, normal position, cruise position or retracted position, while the deployed position relates to a position where the wing profile has a higher curvature and might also be referred to as drooped position, landing position, on-ground position or extended position.

The connection assembly comprises at least one rotation element, such as a rotation rod or a link, that is mounted to the high lift body and that is mounted to the main wing rotatably about a first axis of rotation. The rotation element is mounted to the high lift body directly or indirectly, e.g., to a rib of the high lift body. The first axis of rotation preferably extends in parallel to the span direction and/or in parallel to the extension of leading-edge along the wing, so that the high lift body is rotated about the first axis of rotation when moved between the stowed position and the deployed position.

The main wing comprises an upper skin panel for contact with an ambient flow on an upper side of the main wing, and a lower skin panel for contact with the ambient flow on a lower side of the main wing. The upper skin panel has a leading-edge portion in the area of a leading-edge of the main wing and facing the high lift body. The upper skin panel and the lower skin panel might be joined at the leading-edge of the main wing, or might have an open end at the leading-edge of the main wing, where they might be connected or supported against each other via a front spar.

The high lift body comprises a rigid portion and a flexible skin portion configured for contact with the ambient flow. The rigid portion is mounted to the rotation element. The flexible skin portion is connected, preferably fixedly and directly connected, in particular directly attached or integrally formed, to the leading-edge portion of the upper skin panel and is connected, preferably fixedly and directly connected, in particular directly attached or integrally formed, to the rigid portion of the high lift body, preferably in the area of a leading-edge of the high lift body. The flexible skin portion is configured to be deformed, preferably elastically deformed, between a stowed deformation state and a deployed deformation state, when the high lift body is moved between the stowed position and the deployed position, so that the flexible skin portion is in the stowed deformation state when the high lift body is in the stowed position and the flexible skin portion is in the deployed deformation state when the high lift body is in the deployed position.

Similar wings are known in the art. By increasing the curvature of the wing profile when the high lift body is moved to the deployed position, lift of the related aircraft can be increased, in particular to allow approach and landing with lower speed and on shorter runways. High lift assemblies with a drooping, downward rotating high lift body that is sealed to the leading-edge portion of the upper skin panel, such as droop nose assemblies, relate to simple and effective high lift devices. Some known droop nose assemblies have a step or discontinuity at the upper skin at the transition between the high lift body and the main wing when the high lift body is moved to the deployed position, which might lead to a peak in the aerodynamic pressure profile in this area. Other known droop nose assemblies have a complicated design to avoid discontinuities at the upper skin surface.

SUMMARY OF THE INVENTION

Therefore, an object of the present invention is to provide a wing having a very simple and efficient leading-edge high lift assembly with an advantageous aerodynamic pressure profile.

This object is achieved in that the rigid portion is mounted to the rotation element rotatably about a second axis of rotation. The second axis of rotation preferably extends in a span direction and/or in parallel to the first axis of rotation. In such a way, by rotation of the rotation element about the first axis of rotation, the high lift body can rotate relative to the rotation element about the second axis of rotation and can be pivoted downwards to increase the curvature of the wing in a very simple and reliable manner, while at the same time the flexible skin portion of the high lift body is continuously bent without forming any discontinuities or steps, thereby leading to an aerodynamically advantageous wing profile.

According to a preferred embodiment, the rotation element comprises at least one link element or link plate. The link element might have an elongate form extending at least between the first and second axes of rotation, while the link plate might have a triangular or other plate-like form. Such a link or link plate relates to a very simple and efficient rotation element.

According to a further preferred embodiment, the rotation element is mounted to a rib of the main wing, preferably to a front end of a rib of the main wing, rotatably about the first axis of rotation, preferably so that the high lift body, when moved from the stowed position to the deployed position, is moved at least partly under the rib by the rotating rotation element. Preferably, the first axis of rotation intersects the rib, i.e., extends within the cross-section of the main wing. The rib is a strong structural part and extends forward in the chord direction, which makes it advantageous to support the rotation element.

According to a further preferred embodiment, the rotation element is arranged such that the first axis of rotation extends above the second axis of rotation, i.e., on a higher level as the second axis of rotation, with respect to a normal position of the aircraft of the ground. This applies at least when the high lift body is in the deployed position, preferably also when the high lift body is in the stowed position, i.e., for the entire movement path of the rotation element. Preferably, the rotation element is arranged such that when the high lift body is moved from the stowed position to the deployed position, the rotation element rotates from a forward extending orientation to a downward extending orientation. In such a way, a very simple and efficient kinematic is obtained.

According to a further preferred embodiment, the connection assembly comprises a drive unit mounted to the main wing, preferably to the rib of the main wing, and directly or indirectly coupled to the rotation element for driving the rotation element for rotation about the first axis of rotation to move the high lift body between the stowed position and the deployed position. By being coupled to the rotation element, the drive unit can efficiently move the high lift body without being directly coupled to the high lift body, so that the drive unit can be formed smaller and lighter.

In particular, it is preferred that the drive unit comprises a drive strut mounted to the rotation element rotatably about a strut axis spaced from the first axis of rotation and preferably extending in the span direction and/or in parallel to the first axis of rotation. By such a drive strut the high lift body can be driven very efficiently.

It is further preferred that the strut axis is arranged between the first axis of rotation and the second axis of rotation, or within a triangular arrangement together with the first axis of rotation and the second axis of rotation, in particular when the rotation element is formed as a link plate. In such a way, a minimum actuation movement is required to move the high lift body between the stowed position and the deployed position.

Alternatively, it is preferred that the strut axis is arranged in a position opposite from the second axis of rotation with respect to the first axis of rotation, so that the first axis of rotation is arranged between the strut axis and the second axis of rotation, i.e., the rotation element extends in both directions from the first axis of rotation. In such a way, a minimum actuation force is required to move the high lift body between the stowed position and the deployed position.

It is further preferred that the drive unit comprises a rotating actuator including a rotating arm rotatably driven about a drive axis and mounted to the drive strut rotatably about an arm axis. The rotating actuator is preferably mounted to the main wing, preferably to the rib of the main wing. Such a rotating actuator allows a very simple and efficient actuation.

Alternatively, it is preferred that the drive unit comprises a linear actuator, such as an electromagnetic linear motor or hydraulic cylinder, mounted to the main wing, preferably to the rib of the main wing, rotatably about an actuator axis, preferably at its one end, and configured for linearly moving the drive strut, preferably at its opposite end. Such a linear actuator also allows a very simple and efficient actuation.

According to a preferred embodiment, the wing further comprises a lower cover panel for covering a gap between the lower rear end of the high lift body and a front end of a lower skin panel. Preferably, the lower cover panel is mounted to the main wing, preferably to the rib of the main wing, and/or to the high lift body by a cover linkage comprising at least one cover link, so that the lower cover panel is preferably movable to cover the gap while the high lift body is moved between the stowed position and the deployed position. By such a lower cover panel closing the gap between the lower rear end of the high lift body and a front end of a lower skin panel, a possibly smooth lower surface of the wing can be obtained, thereby essentially reducing drag.

In particular, it is preferred that the cover linkage comprises one or more cover links, preferably two spaced cover links, rotatably mounting the lower cover panel to the main wing, preferably to the rib of the main wing. Preferably, the cover linkage comprises a further cover link rotatably mounting the lower cover panel to the rotation element. In such a way, the lower cover panel can be moved by the rotation element, so that the position of the lower cover panel can be adjusted to cover the gap at any time during movement of the high lift body.

Alternatively, it is preferred that the cover linkage comprises at least one cover link rotatably mounting the lower cover panel to the main wing, preferably to the rib of the main wing, while the lower cover panel is rotatably mounted to the high lift body, or rotatably mounting the lower cover panel to the high lift body while the lower cover panel is rotatably mounted to the main wing, preferably to the rib of the main wing. In such a way, an alternative design is provided, whereby the lower cover panel can be moved by the high lift body, so that the position of the lower cover panel can be adjusted to cover the gap at any time during movement of the high lift body.

A further aspect of the invention relates to a leading-edge high lift assembly for the wing according to any of the afore-described embodiments. The leading-edge high lift assembly comprises a high lift body and a connection assembly for connecting the high lift body to a main wing in such a way that the high lift body is movable relative to the main wing between a stowed position and a deployed position. The connection assembly comprises a rotation element that is mounted to the high lift body and that is configured to be mounted to the main wing rotatably about an axis of rotation. The high lift body comprises a rigid portion and a flexible skin portion. The rigid portion is mounted to the rotation element. The flexible skin portion is configured to be connected to a leading-edge portion of an upper skin panel of the main wing and is connected to the rigid portion of the high lift body. The flexible skin portion is configured to be deformed between a stowed deformation state and a deployed deformation state, when the high lift body is moved between the stowed position and the deployed position. The rigid portion is mounted to the rotation element rotatably about a second axis of rotation. Features and effects described above in connection with the wing apply vis-a-vis also to the leading-edge high lift assembly.

A further aspect of the invention relates to an aircraft comprising the wing according to any of the afore-described embodiments and/or comprising the leading-edge high lift assembly according to any of the afore described embodiments. Features and effects described above in connection with the wing and in connection with the leading-edge high lift assembly apply vis-a-vis also in the case of the aircraft.

BRIEF DESCRIPTION OF THE DRAWINGS

Preferred embodiments of the present invention are explained hereinafter in more detail by means of a drawing. The drawing shows in FIG. 1 shows a perspective view of an aircraft according to the invention.

DETAILED DESCRIPTION OF THE PREFERRED EMBODIMENTS

Figure 1:
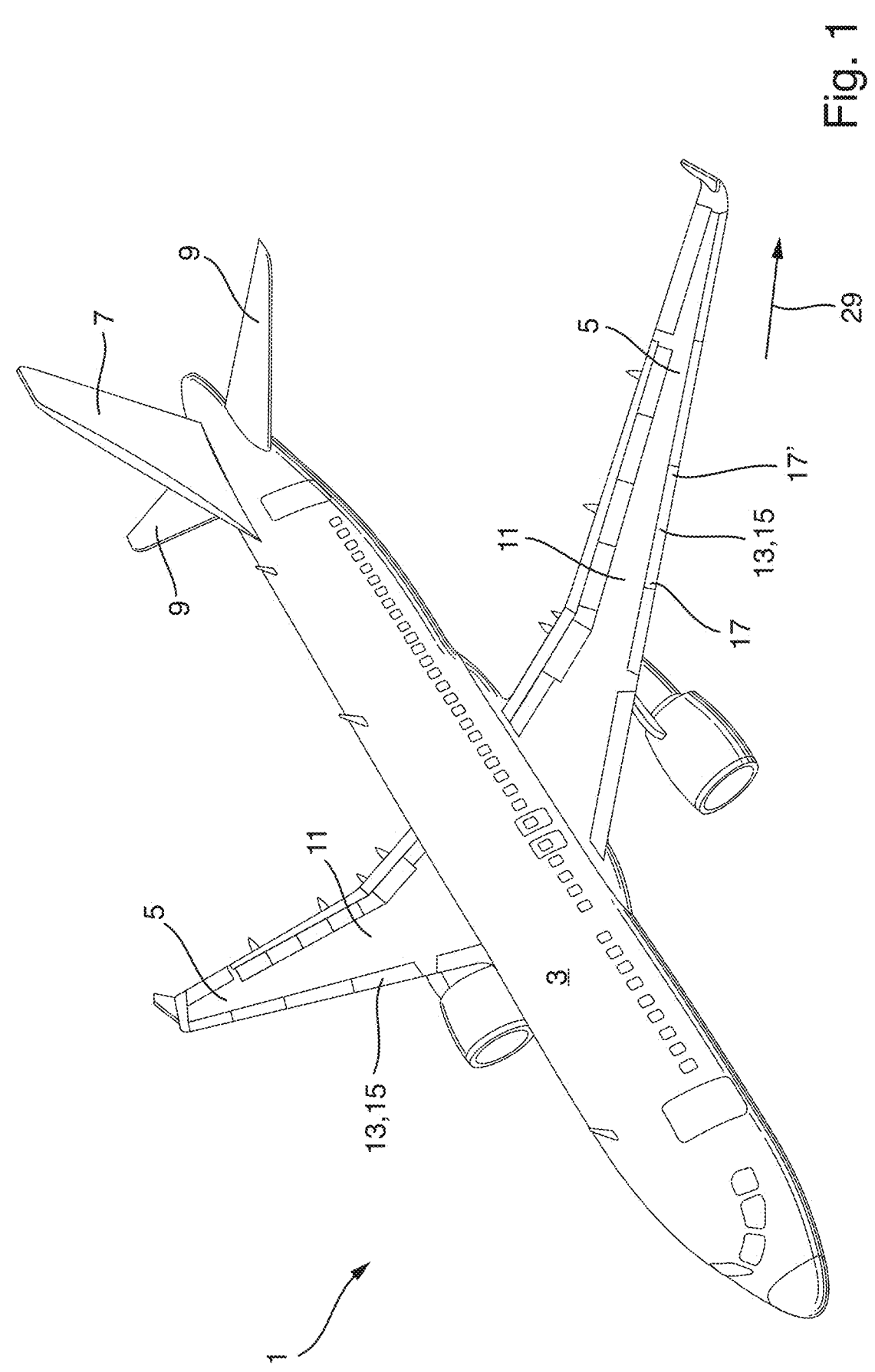

In FIG. 1 an embodiment of an aircraft 1 according to the present invention is illustrated. The aircraft 1 comprises a fuselage 3, wings 5, a vertical tail plane 7 and a horizontal tail plane 9. FIGS. 2a to 10b show in more detail several embodiments of the wings 5.

Figure 2A:
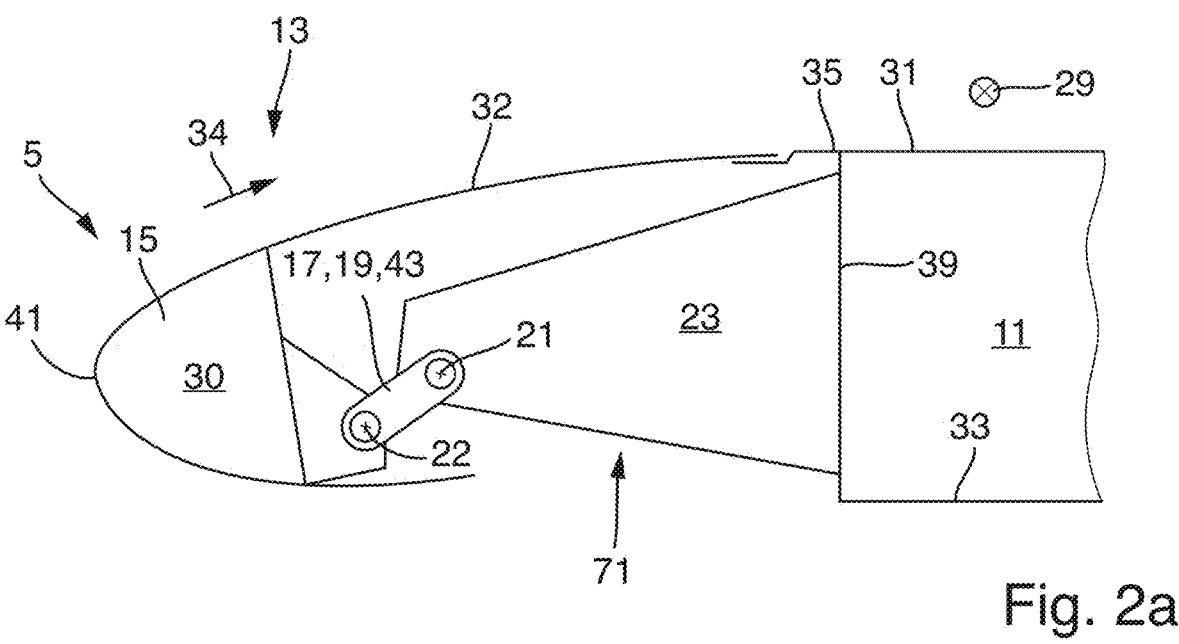
FIGS. 2a and 2b show a schematic cross-sectional view across the span direction of a wing according to a first embodiment of the invention with a high lift body in the stowed position (FIG. 2a) and in the deployed position (FIG. 2b)
Figure 2B:
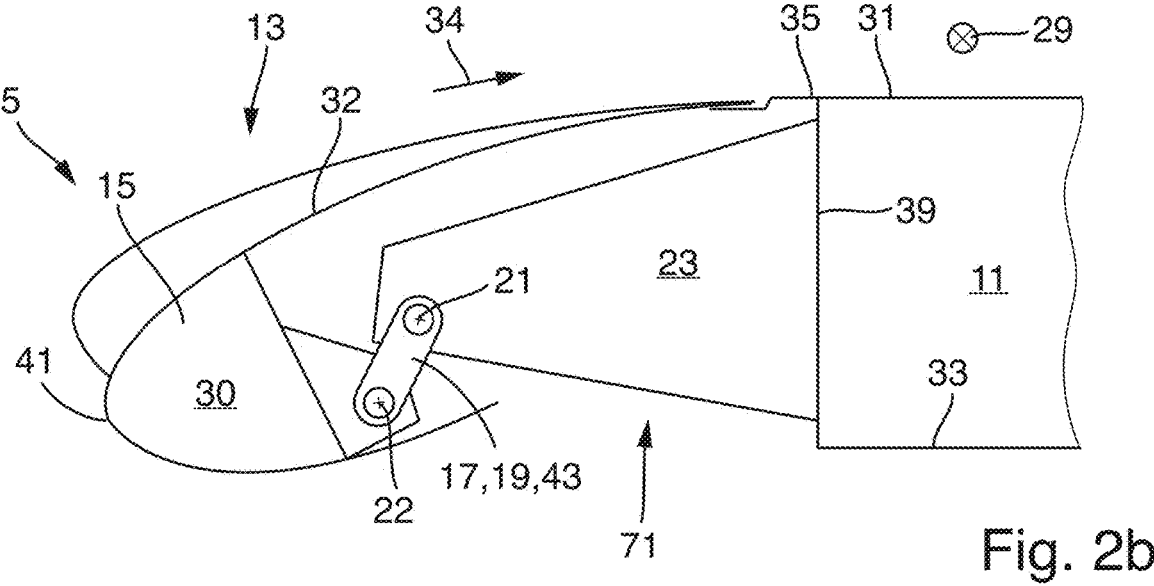

FIGS. 2a and 2b show a first embodiment of the wing 5 according to the invention. The wing 5 comprises a main wing 11 and a leading-edge high lift assembly 13 movable relative to the main wing 11 to increase lift of the wing 5. The leading-edge high lift assembly 13 comprises a high lift body 15 and a connection assembly 17. The high lift body 15 is a droop high lift body also referred to as droop nose, droop leading-edge, droop flap or slat, in particular sealed slat. The connection assembly 17 is configured for connecting the high lift body 15 to the leading-edge of the main wing 11 in such a way that the high lift body 15 is movable relative to the main wing 11 between a stowed position and a deployed position. The stowed position relates to a position where the wing profile has a lower curvature, while the deployed position relates to a position where the wing profile has a higher curvature.

The connection assembly 17 comprises at least one rotation element 19 that is mounted to the high lift body 15 and that is mounted to the main wing 11 rotatably about a first axis of rotation 21. The first axis of rotation 21 extends in parallel to a span direction 29 and in parallel to the extension of the leading-edge along the wing 5, so that the high lift body 15 is rotated about the first axis of rotation 21 when moved between the stowed position and the deployed position. The first axis of rotation 21 of the rotation element 19 extends inside of an outer mold line of the wing 5, specifically through a rib 23 of the main wing 11.

The main wing 11 comprises an upper skin panel 31 for contact with an ambient flow 34 on an upper side of the main wing 11, and a lower skin panel 33 for contact with the ambient flow 34 on a lower side of the main wing 11. The upper skin panel 31 has a leading-edge portion 35 in the area of a leading-edge of the main wing 11 and facing the high lift body 15. The upper skin panel 31 and the lower skin panel 33 are connected and supported against each other via a front spar 39.

The high lift body 15 comprises a rigid portion 30 and a flexible skin portion 32 configured for contact with the ambient flow 34. The rigid portion 30 is mounted to the rotation element 19 rotatably about a second axis of rotation 22. The second axis of rotation 22 extends in a span direction 29 and in parallel to the first axis of rotation 21. The flexible skin portion 32 is fixedly and directly attached to the leading-edge portion 35 of the upper skin panel 31 and is fixedly and directly attached to the rigid portion 30 of the high lift body 15 in the area of a leading edge 41 of the high lift body 15. The flexible skin portion 32 is configured to be elastically deformed between a stowed deformation state and a deployed deformation state, when the high lift body 15 is moved between the stowed position and the deployed position, so that the flexible skin portion 32 is in the stowed deformation state when the high lift body 15 is in the stowed position and the flexible skin portion 32 is in the deployed deformation state when the high lift body 15 is in the deployed position.

The rotation element 19 is mounted to a front end of a rib 23 of the main wing 11 rotatably about the first axis of rotation 21, so that the high lift body 15, when moved from the stowed position to the deployed position, is moved partly under the rib 23 by the rotating rotation element 19. The rotation element 19 is arranged such that the first axis of rotation 21 extends above the second axis of rotation 22, i.e., on a higher level than the second axis of rotation 22, with respect to a normal position of the aircraft 1 of the ground. This applies at least when the high lift body 15 is in the deployed position, but in the present embodiment also when the high lift body 15 is in the stowed position, i.e., for the entire movement path of the rotation element 19. The rotation element 19 is arranged such that when the high lift body 15 is moved from the stowed position to the deployed position, the rotation element 19 rotates from a forward extending orientation to a downward extending orientation.

Figure 3A:
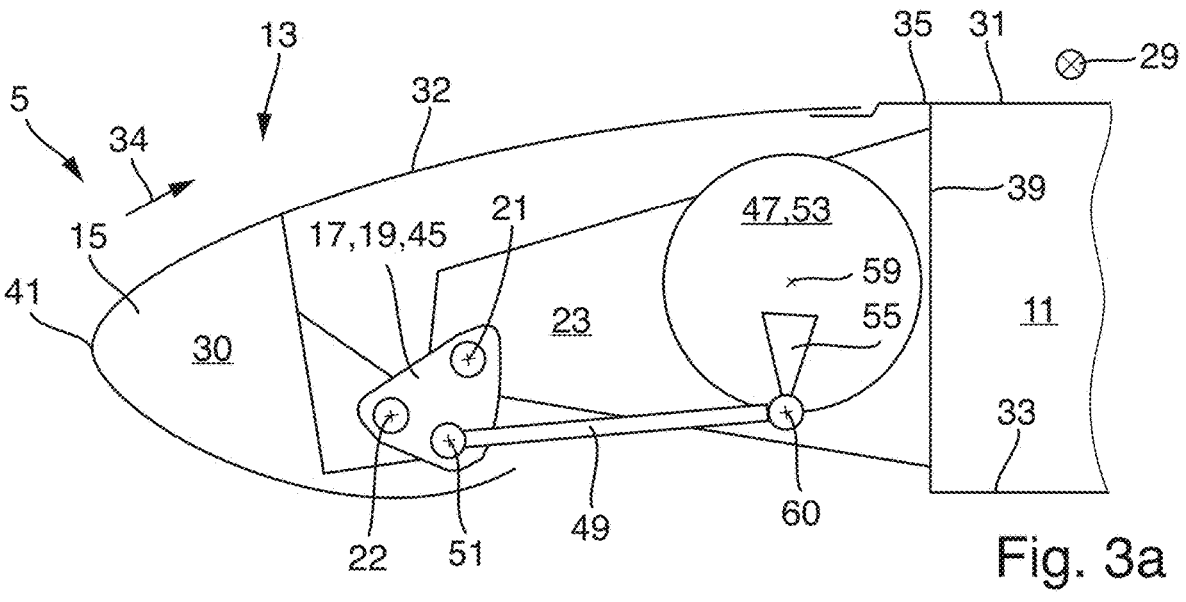
FIGS. 3a and 3b show a schematic cross-sectional view across the span direction of a wing according to a second embodiment of the invention with a high lift body in the stowed position (FIG. 3a) and in the deployed position (FIG. 3b)
Figure 4A:
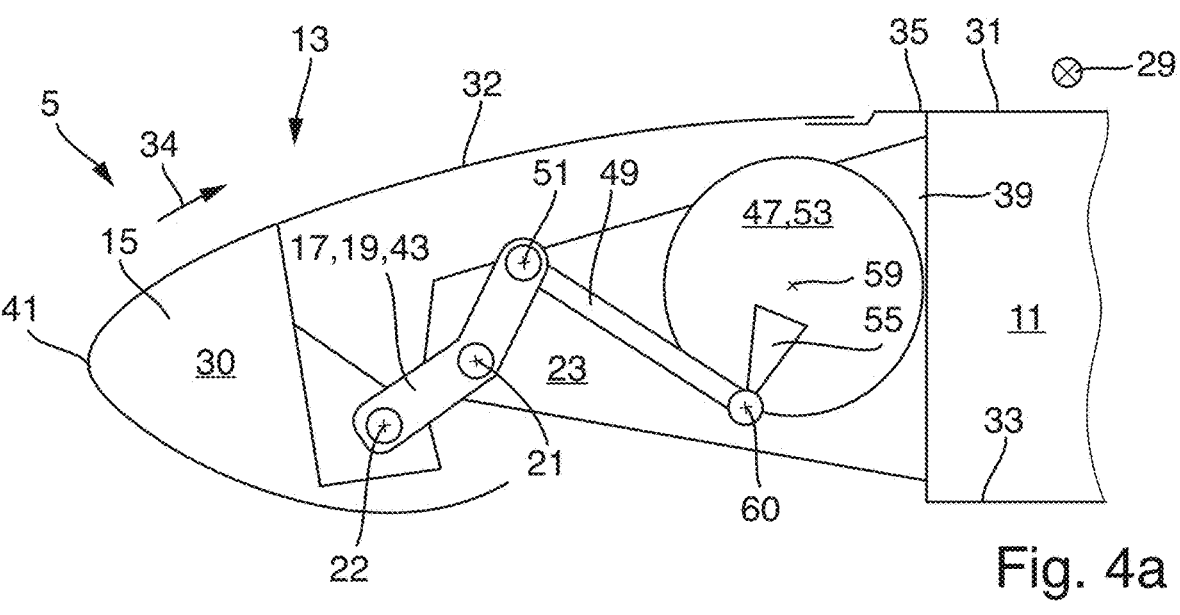
FIGS. 4a and 4b show a schematic cross-sectional view across the span direction of a wing according to a third embodiment of the invention with a high lift body in the stowed position (FIG. 4a) and in the deployed position (FIG. 4b)
Figure 4B:
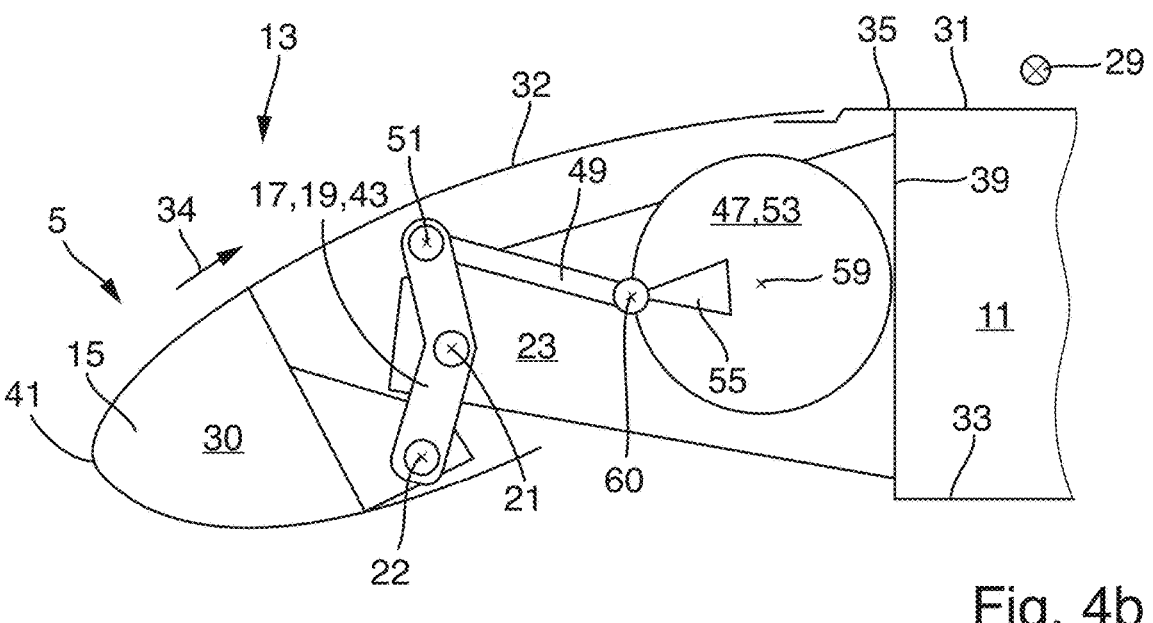
Figure 5A:
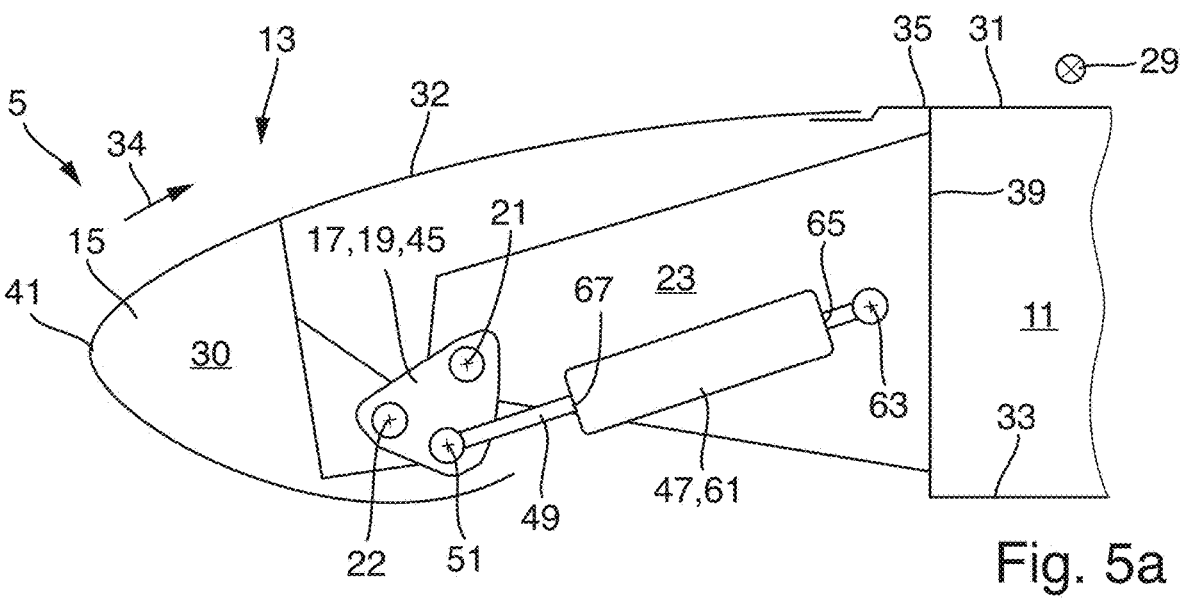
FIGS. 5a and 5b show a schematic cross-sectional view across the span direction of a wing according to a fourth embodiment of the invention with a high lift body in the stowed position (FIG. 5a) and in the deployed position (FIG. 5b)

In the embodiments shown in FIGS. 2a, 4a, 6a-10a, the rotation element 19 is in the form of a link element 43, while in the embodiments shown in FIGS. 3a and 5a the rotation element 19 is in the form of a link plate 45. The link element 43 has an elongate form extending at least between the first and second axes of rotation 21, 22, while the link plate 45 has a triangular form.

In the embodiments shown in FIGS. 3a to 6a, the connection assembly 17 comprises a drive unit 47 mounted to the rib 23 of the main wing 11 and coupled to the rotation element 19 for driving the rotation element 19 for rotation about the first axis of rotation 21 to move the high lift body 15 between the stowed position and the deployed position. The drive unit 47 comprises a drive strut 49 mounted to the rotation element 19 rotatably about a strut axis 51 spaced from the first axis of rotation 21 and extending in the span direction 29 and in parallel to the first axis of rotation 21.

Figure 3B:
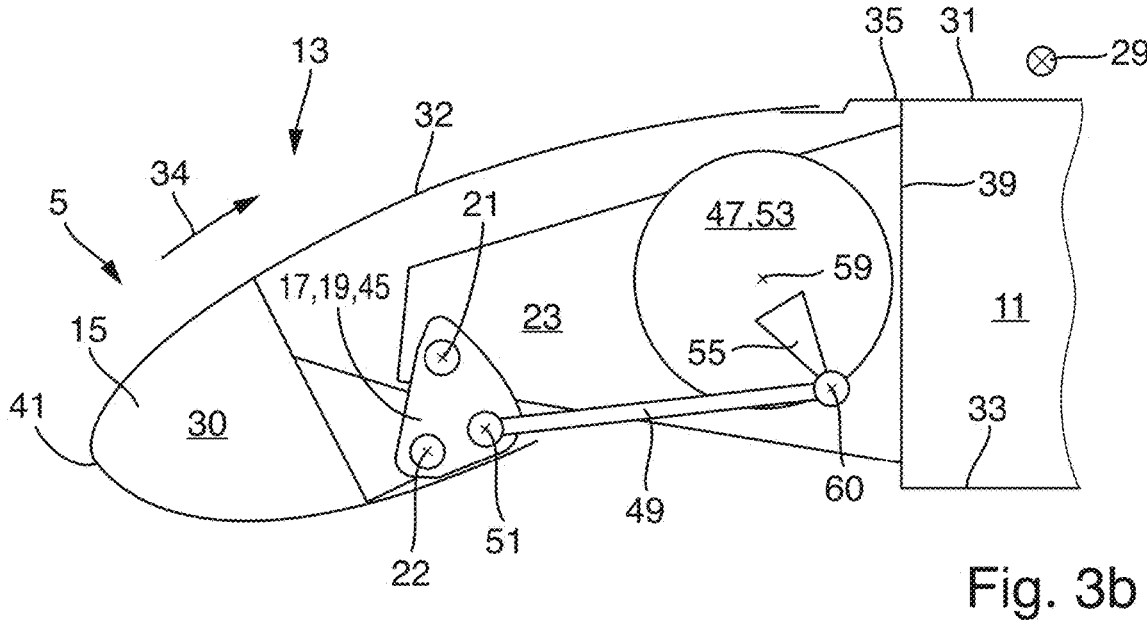
Figure 5B:
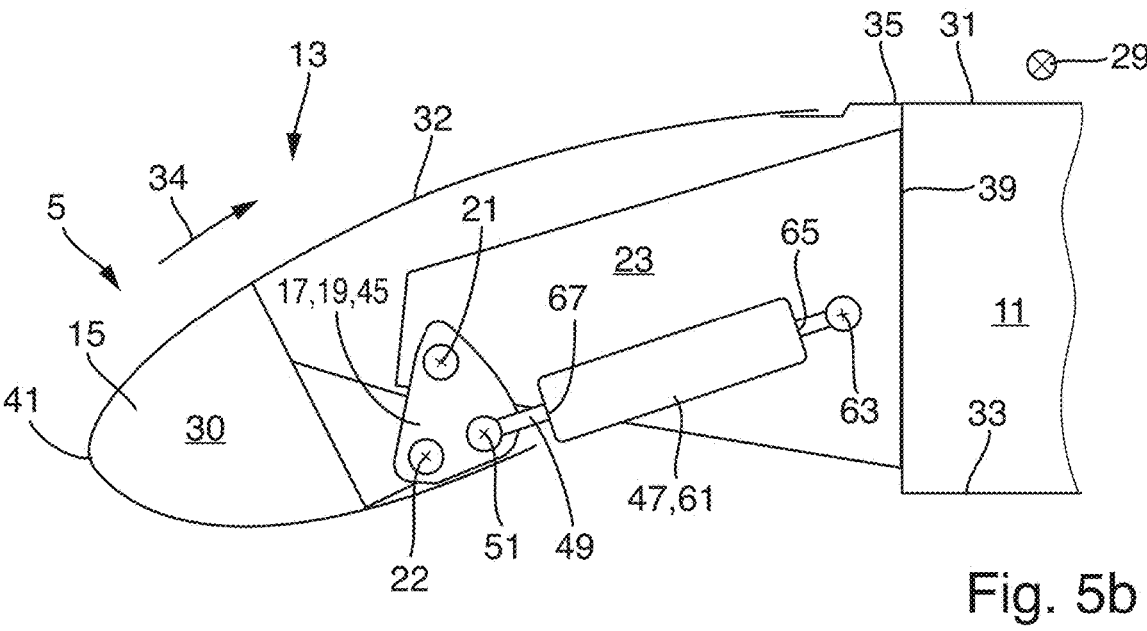

In the embodiment shown in FIGS. 3 and 5, where the rotation element 19 is formed as a link plate 45, the strut axis 51 is arranged within a triangular arrangement together with the first axis of rotation 21 and the second axis of rotation 22. In the embodiments shown in FIGS. 4a and 6a, where the rotation element 19 is formed as a link element 43, the strut axis 51 is arranged in a position opposite from the second axis of rotation 22 with respect to the first axis of rotation 21, so that the first axis of rotation 21 is arranged between the strut axis 51 and the second axis of rotation 22, i.e., the rotation element 19 extends in both directions from the first axis of rotation 21.

In the embodiments shown in FIGS. 3a and 4a, the drive unit 47 comprises a rotating actuator 53 including a rotating arm 55 rotatably driven about a drive axis 59 and mounted to the drive strut 49 rotatably about an arm axis 60. The rotating actuator 53 is mounted to the rib 23 of the main wing 11.

Figure 6A:
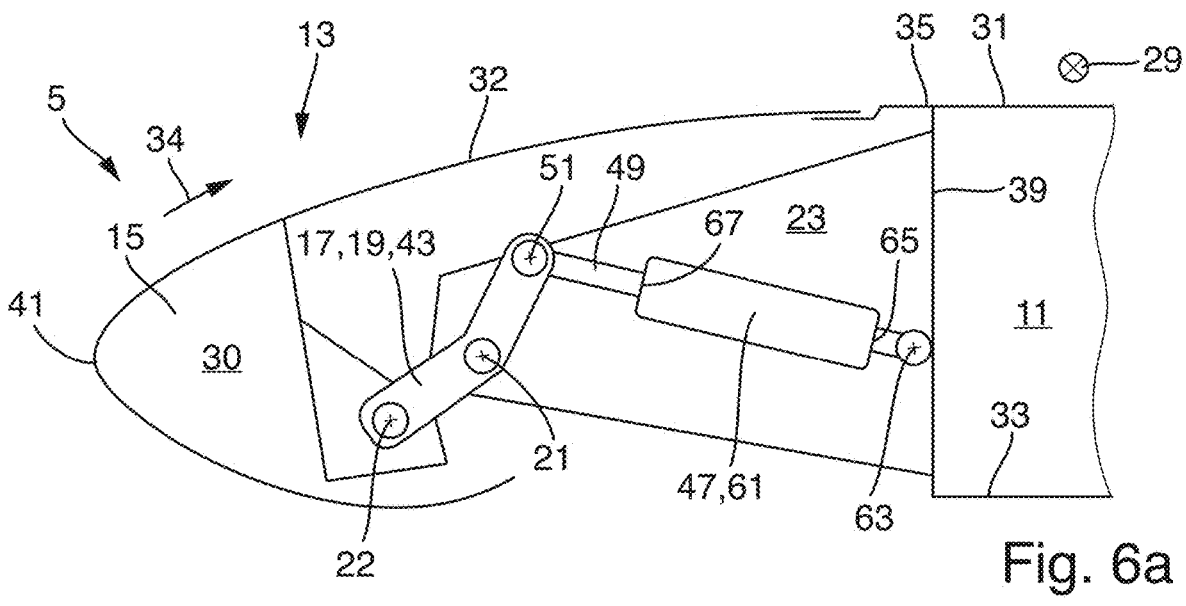
FIGS. 6a and 6b show a schematic cross-sectional view across the span direction of a wing according to a fifth embodiment of the invention with a high lift body in the stowed position (FIG. 6a) and in the deployed position (FIG. 6b)
Figure 6B:
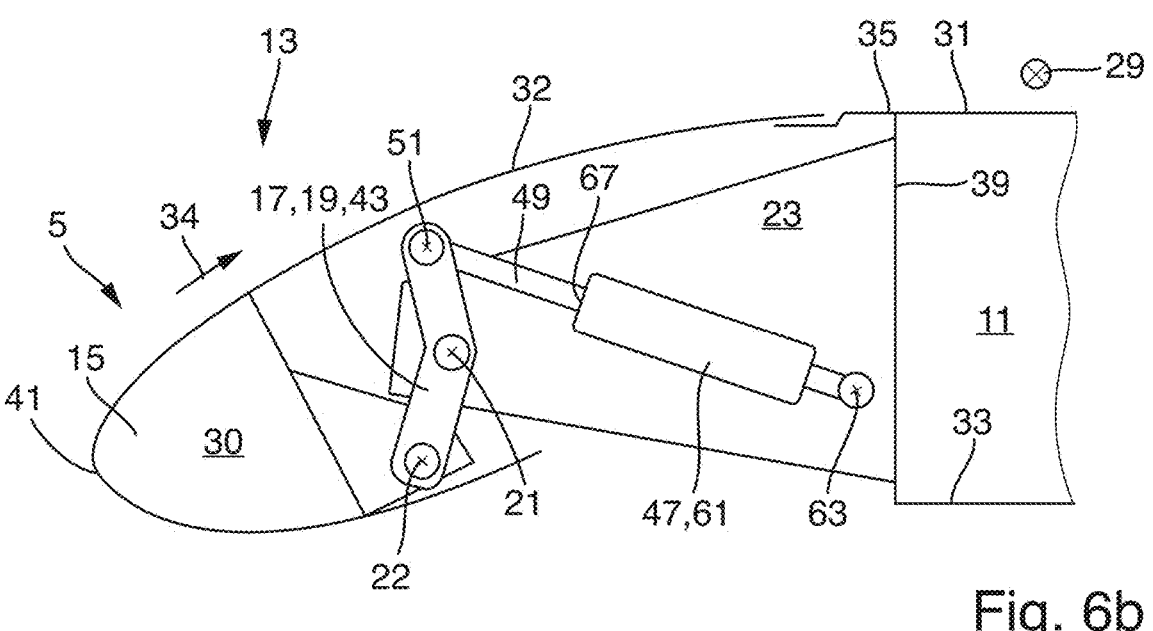

In the embodiments shown in FIGS. 5a and 6a, the drive unit 47 comprises a linear actuator 61, such as an electromagnetic linear motor or hydraulic cylinder, mounted to the rib 23 of the main wing 11 rotatably about an actuator axis 63 at its one end 65, and configured for linearly moving the drive strut 49 at its opposite end 67.

In the embodiments shown in FIGS. 7a to 10a, the wing 11 further comprises a lower cover panel 69 for covering a gap 71 between the lower rear end of the high lift body 15 and a front end of a lower skin panel 33. The lower cover panel 69 is mounted to the rib 23 of the main wing 11, and/or to the high lift body 15 by a cover linkage 77 comprising at least one cover link 79, so that the lower cover panel 69 is movable to cover the gap 71 while the high lift body 15 is moved between the stowed position and the deployed position.

Figure 7A:
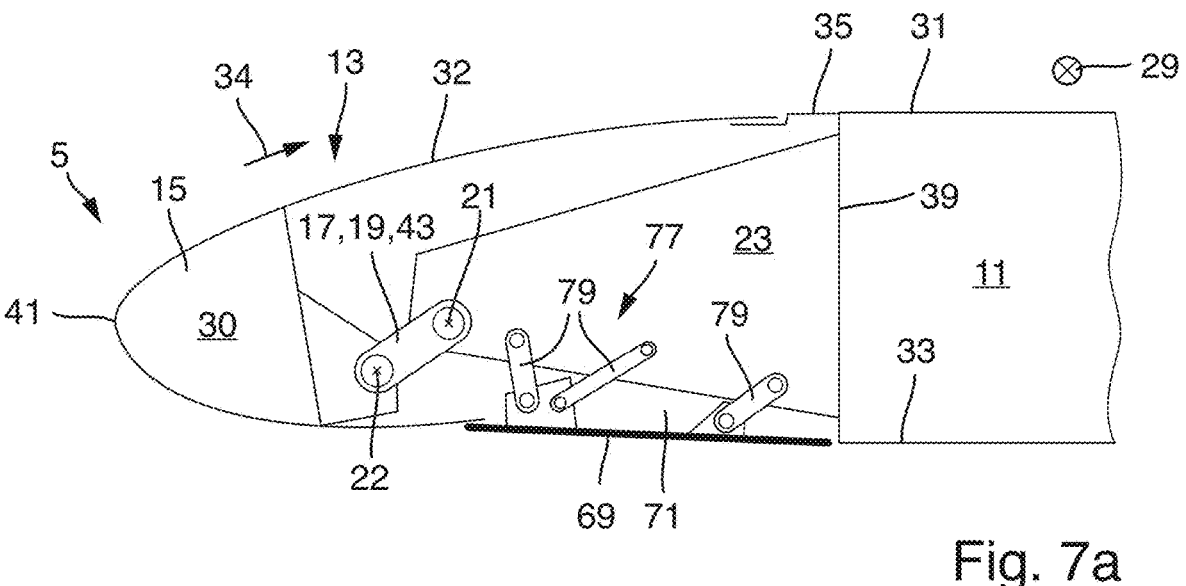
FIGS. 7a and 7b show a schematic cross-sectional view across the span direction of a wing according to a sixth embodiment of the invention with a high lift body in the stowed position (FIG. 7a) and in the deployed position (FIG. 7b)
Figure 7B:
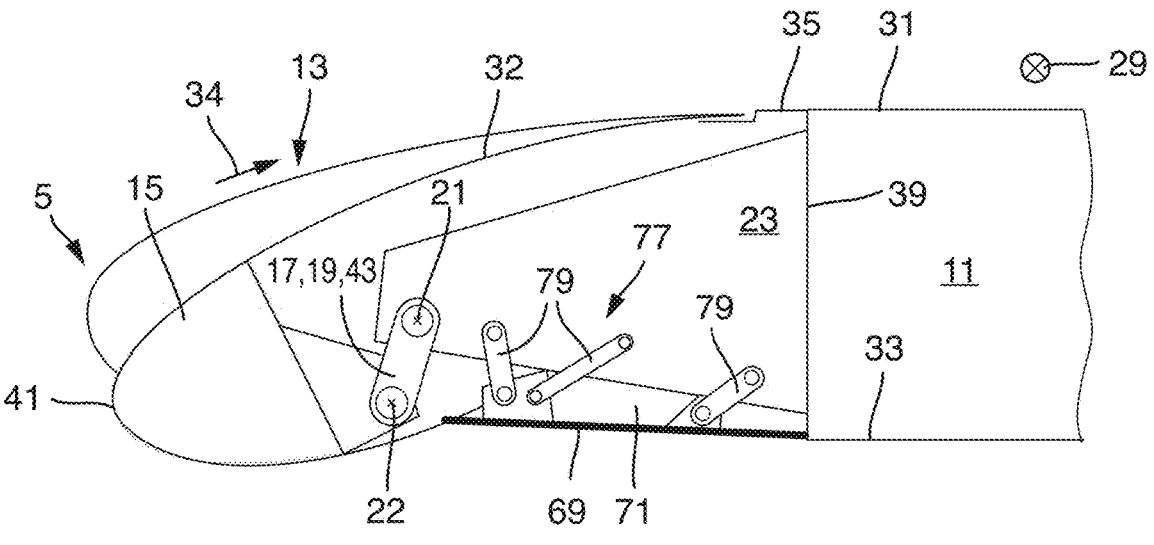
Figure 8A:
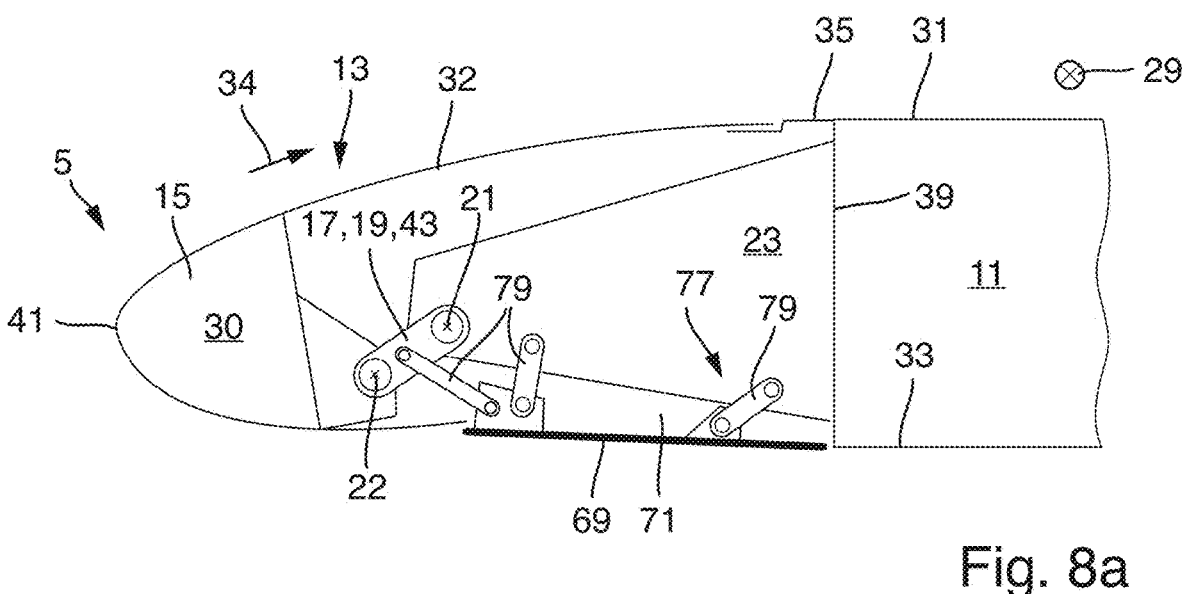
FIGS. 8a and 8b show a schematic cross-sectional view across the span direction of a wing according to a seventh embodiment of the invention with a high lift body in the stowed position (FIG. 8a) and in the deployed position (FIG. 8b)
Figure 8B:
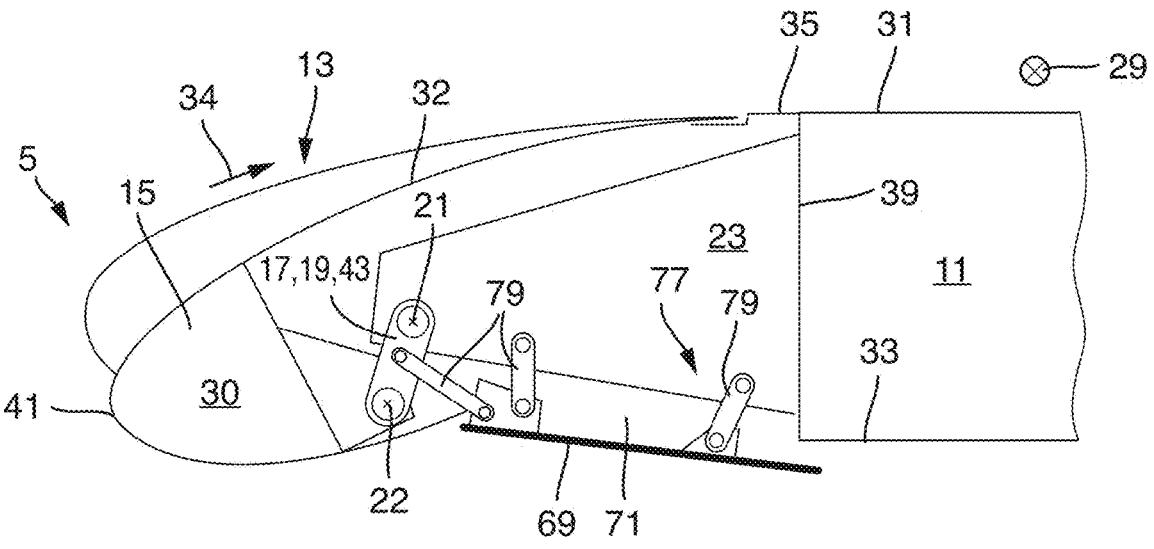

In the embodiments shown in FIGS. 7a and 8a, the cover linkage 77 comprises two spaced cover links 79, rotatably mounting the lower cover panel 69 to the rib 23 of the main wing 11. In the embodiment shown in FIG. 8a, the cover linkage 77 comprises a further cover link 79 rotatably mounting the lower cover panel 69 to the rotation element 19.

Figure 9A:
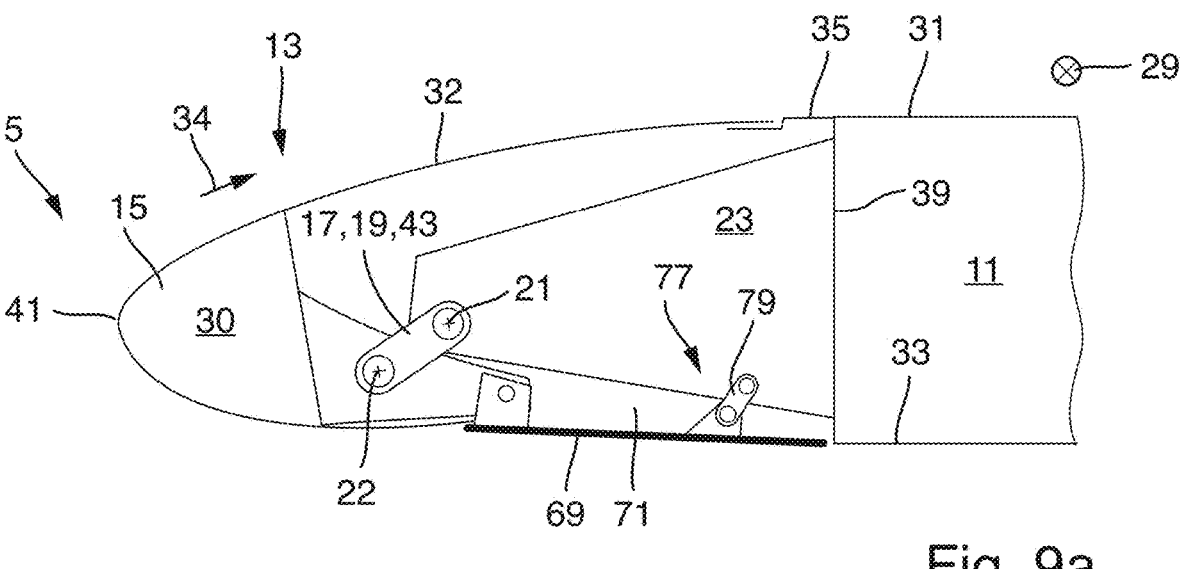
FIGS. 9a and 9b show a schematic cross-sectional view across the span direction of a wing according to an eighth embodiment of the invention with a high lift body in the stowed position (FIG. 9a) and in the deployed position (FIG. 9b)
Figure 9B:
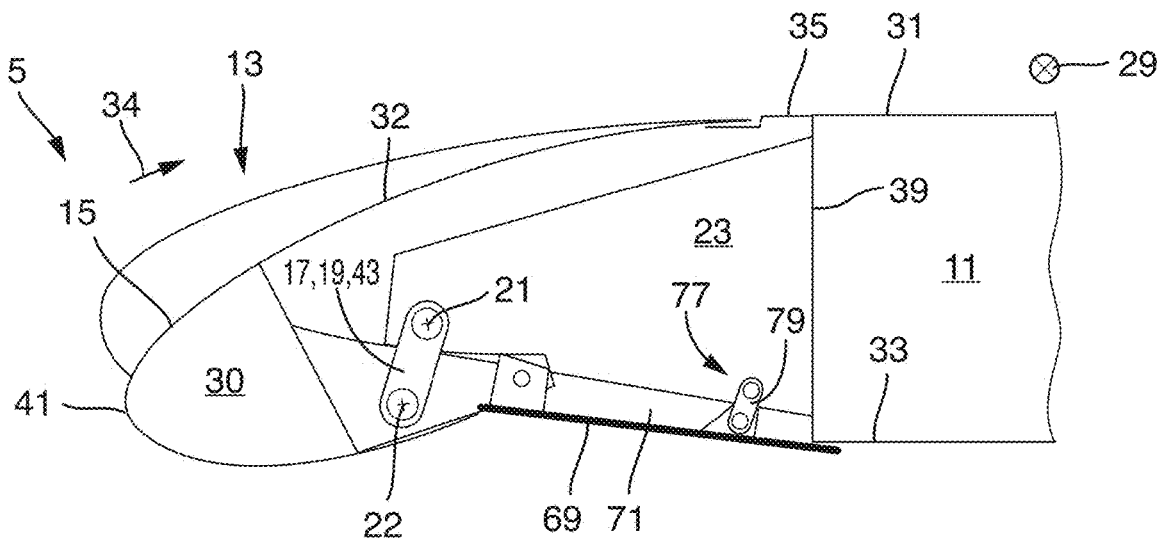
Figure 10A:
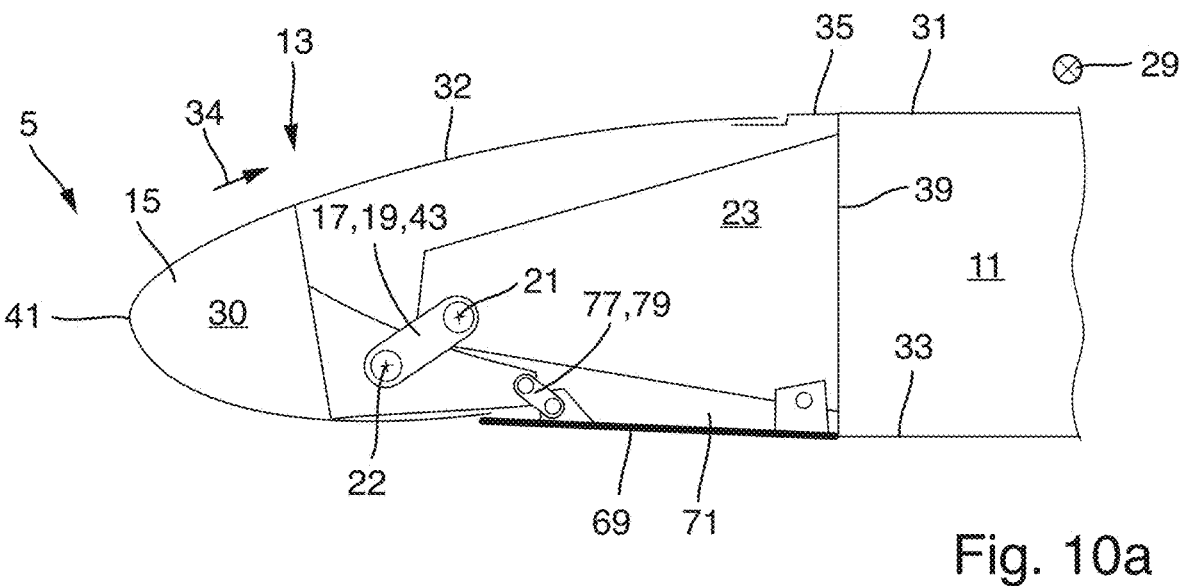
FIGS. 10a and 10b show a schematic cross-sectional view across the span direction of a wing according to a nineth embodiment of the invention with a high lift body in the stowed position (FIG. 10a) and in the deployed position (FIG. 10b).
Figure 10B:
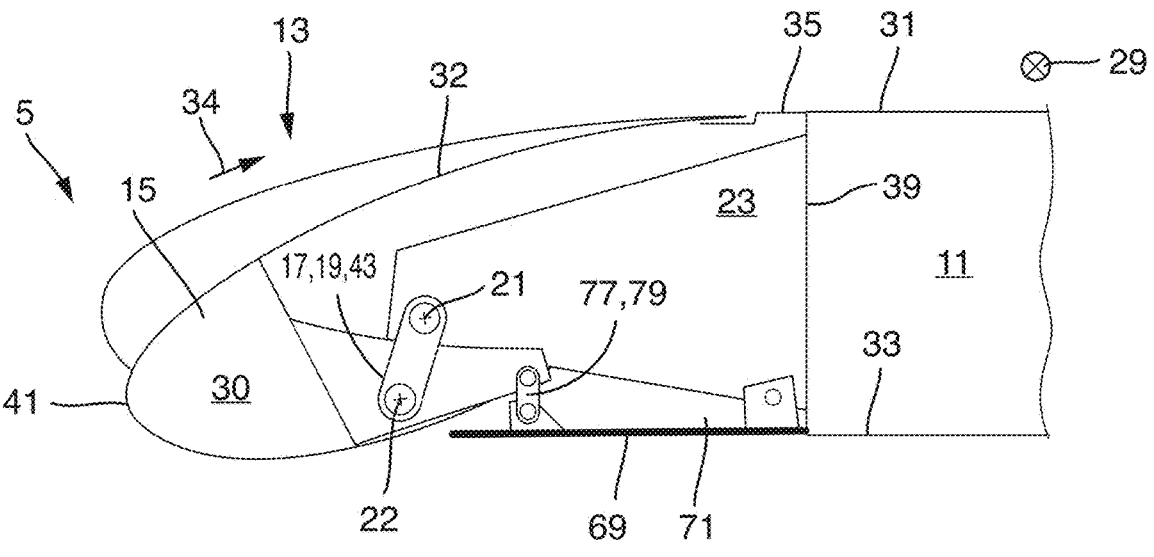

In the embodiment shown in FIGS. 9a and 9b, the cover linkage 77 comprises one cover link 79 rotatably mounting the lower cover panel 69 to the rib 23 of the main wing 11, while the lower cover panel 69 is rotatably mounted to the high lift body 15. In the embodiment shown in FIG. 10a, the cover linkage 77 comprises one cover link 79 rotatably mounting the lower cover panel 69 to the high lift body 15 while the lower cover panel 69 is rotatably mounted to the rib 23 of the main wing 11.

As shown in FIG. 1, the leading-edge high lift assembly 13 comprises a further connection assembly 17' spaced from the connection assembly 17 in the span direction 29 and preferably formed as the connection assembly 17. At least two spaced connection assemblies 17, 17' are provided to carry each high lift body 15. Each connection assembly 17, 17' might also comprise more than one rotation element 19.

By the invention as described above, a wing 5 with a very efficient leading-edge high lift assembly 13 can be formed. By rotation of the rotation element 19 about the first axis of rotation 21, the high lift body 15 can rotate relative to the rotation element 19 about the second axis of rotation 22 and can be pivoted downwards to increase the curvature of the wing 5 in a very simple and reliable manner, while at the same time the flexible skin portion 32 of the high lift body 15 is continuously bent without forming any discontinuities or steps, thereby leading to an aerodynamically advantageous wing profile.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising
a main wing, and
a leading-edge high lift assembly comprising
   a high lift body, and
   a connection assembly connecting the high lift body to the main wing in such a way that the high lift body is movable relative to the main wing between a stowed position and a deployed position,
wherein the connection assembly comprises at least one rotation element that is mounted to the high lift body and that is mounted to the main wing rotatably about a first axis of rotation,
wherein the main wing comprises an upper skin panel and a lower skin panel,
wherein the upper skin panel has a leading-edge portion,
wherein the high lift body comprises a rigid portion and a flexible skin portion,
wherein the rigid portion is mounted to the rotation element,
wherein the flexible skin portion is connected to the leading-edge portion of the upper skin panel of the main wing and is connected to the rigid portion of the high lift body, and
wherein the flexible skin portion is configured to be deformed between a stowed deformation state and a deployed deformation state, when the high lift body is moved between the stowed position and the deployed position, and
wherein the rigid portion is mounted to the rotation element rotatably about a second axis of rotation,
further comprising a lower cover panel for covering a gap between a lower rear end of the high lift body and a front end of the lower skin panel,
wherein the lower cover panel is mounted to the main wing, to the high lift body, or to both the main wing and the high lift body by a cover linkage comprising at least one cover link, so that the lower cover panel is movable to cover the gap while the high lift body is moved between the stowed position and the deployed position.

2. The wing according to claim 1, wherein the rotation element comprises at least one link element or link plate.

3. The wing according to claim 1, wherein the rotation element is mounted to a rib of the main wing rotatably about the first axis of rotation.

4. The wing according to claim 1, wherein the rotation element is arranged such that the first axis of rotation extends above the second axis of rotation.

5. The wing according to claim 1, wherein the connection assembly comprises a drive unit mounted to the main wing and coupled to the rotation element for driving the rotation element for rotation about the first axis of rotation.

6. The wing according to claim 5, wherein the drive unit comprises a drive strut mounted to the rotation element rotatably about a strut axis spaced from the first axis of rotation.

7. The wing according to claim 6, wherein the strut axis is arranged between the first axis of rotation and the second axis of rotation, or within a triangular arrangement with the first axis of rotation and the second axis of rotation.

8. The wing according to claim 6, wherein the drive unit comprises a rotating actuator including a rotating arm rotatably driven about a drive axis and mounted to the drive strut rotatably about an arm axis.

9. The wing according to claim 6, wherein the drive unit comprises a linear actuator mounted to the main wing rotatably about an actuator axis and configured for linearly moving the drive strut.

10. The wing according to claim 1,
wherein the cover linkage comprises one or more cover links rotatably mounting the lower cover panel to the main wing, and
wherein the cover linkage comprises a further cover link rotatably mounting the lower cover panel to the rotation element.

11. The wing according to claim 1, wherein the cover linkage comprises at least one cover link rotatably mounting the lower cover panel to the main wing while the lower cover panel is rotatably mounted to the high lift body, or rotatably mounting the lower cover panel to the high lift body while the lower cover panel is rotatably mounted to the main wing.

12. A leading-edge high lift assembly for the wing according to claim 1, comprising
a high lift body, and
a connection assembly for connecting the high lift body to the main wing in such a way that the high lift body is movable relative to the main wing between a stowed position and a deployed position,
wherein the connection assembly comprises at least one rotation element that is mounted to the high lift body and that is configured to be mounted to the main wing rotatably about a first axis of rotation,
wherein the high lift body comprises a rigid portion and a flexible skin portion,
wherein the rigid portion is mounted to the rotation element, wherein the flexible skin portion is configured to be connected to a leading-edge portion of an upper skin panel of the main wing and is connected to the rigid portion of the high lift body,
wherein the flexible skin portion is configured to be deformed between a stowed deformation state and a deployed deformation state, when the high lift body is moved between the stowed position and the deployed position, and
wherein the rigid portion is mounted to the rotation element rotatably about a second axis of rotation.

13. An aircraft comprising the leading-edge high lift assembly according to claim 12.

14. An aircraft comprising the wing according to claim 1.

15. A wing for an aircraft, comprising
a main wing, and
a leading-edge high lift assembly comprising
a high lift body, and
a connection assembly connecting the high lift body to the main wing in such a way that the high lift body is movable relative to the main wing between a stowed position and a deployed position, the connection assembly comprising a drive unit coupled to the rotation element for driving the rotation element for rotation about the first axis of rotation,
wherein the connection assembly comprises at least one rotation element that is mounted to the high lift body and that is mounted to the main wing rotatably about a first axis of rotation,
wherein the main wing comprises an upper skin panel and a lower skin panel,
wherein the upper skin panel has a leading-edge portion,
wherein the high lift body comprises a rigid portion and a flexible skin portion,
wherein the rigid portion is mounted to the rotation element,
wherein the flexible skin portion is connected to the leading-edge portion of the upper skin panel of the main wing and is connected to the rigid portion of the high lift body, and
wherein the flexible skin portion is configured to be deformed between a stowed deformation state and a deployed deformation state, when the high lift body is moved between the stowed position and the deployed position, and
wherein the rigid portion is mounted to the rotation element rotatably about a second axis of rotation,
wherein the drive unit comprises a drive strut mounted to the rotation element rotatably about a strut axis spaced from the first axis of rotation,
wherein the strut axis is arranged in a position opposite from the second axis of rotation with respect to the first axis of rotation, so that the first axis of rotation is arranged between the strut axis and the second axis of rotation.

* * * * *